US006736049B2

(12) United States Patent
Cautenet et al.

(10) Patent No.: US 6,736,049 B2
(45) Date of Patent: May 18, 2004

(54) HIGH PRESSURE LOW VOLUME PUMP

(75) Inventors: Etienne Cautenet, Groslat (FR); Philippe De Talhouet, Paris (FR)

(73) Assignee: Gilson, Inc., Middleton, WI (US)

( * ) Notice: Subject to any disclaimer, the term of this patent is extended or adjusted under 35 U.S.C. 154(b) by 0 days.

(21) Appl. No.: 10/182,882

(22) PCT Filed: Nov. 30, 2001

(86) PCT No.: PCT/US01/44927

§ 371 (c)(1),
(2), (4) Date: Oct. 22, 2002

(87) PCT Pub. No.: WO02/48582

PCT Pub. Date: Jun. 20, 2002

(65) Prior Publication Data

US 2003/0121414 A1 Jul. 3, 2003

(30) Foreign Application Priority Data

Dec. 11, 2000 (EP) ........................................... 00403469

(51) Int. Cl.[7] .............................. F16J 1/14; F16C 11/00
(52) U.S. Cl. ........................................... 92/187; 403/76
(58) Field of Search ....................... 92/31, 187; 403/76; 417/319

(56) References Cited

U.S. PATENT DOCUMENTS 4,753,581 A 6/1988 Hiscock
5,312,233 A 5/1994 Tanny et al. ................ 417/319
5,415,489 A * 5/1995 Hutchins et al. .............. 403/76

* cited by examiner

*Primary Examiner*—Thomas E. Lazo
(74) *Attorney, Agent, or Firm*—Foley & Lardner

(57) ABSTRACT

A piston carrier supports an elongated, slender piston rod for reciprocation in a pump cylinder to pump fluid into and out of the cylinder. The piston rod is made of a material such as sapphire or zircon and has a diameter less than about ten millimeters, and the pump can provide flows of from about 50 nanoliters to about 250 microliters per minute at pressures of several hundred bars. A drive motor rotates a threaded screw and a drive nut of a drive system applies a linear drive force to the piston carrier. A ball and socket connection between the drive system and the piston carrier avoids the need for precise alignment to prevent breakage of the fragile piston. A magnet in the socket holds the ball in place and avoids the need for a spring or other mechanical holder. The socket also includes a ring of a low reluctance material surrounding the ball to increase the magnetic retention force.

9 Claims, 1 Drawing Sheet

HIGH PRESSURE LOW VOLUME PUMP

FIELD OF THE INVENTION

The present invention relates to an improved high pressure low volume pump suitable for use in high pressure liquid chromatography.

DESCRIPTION OF THE PRIOR ART

There is a need for a pump that can accurately deliver precisely measured, very small volumes of liquid at very high pressures. For example, in performing high pressure liquid chromatography (HPLC) procedures, a motor driven pump is typically used to deliver liquid solvents such as methanol, isopropyl alcohol and the like. The trend is to use smaller volumes of solvent for the mobile phase of the chromatography column and to operate at higher pressures. For example, it would be desirable to provide a pump that can deliver fluids at low flow rates in the range of from about 50 nanoliters to about 250 microliters per minute at pressures of several hundred bars.

A piston pump designed for such low flow volumes is necessarily delicate because the liquid handling components of the pump must be very small in size. Low volume HPLC pumps can benefit from the use of a small diameter piston made of sapphire or zircon or the like, because such materials can be provided to close dimensional and surface tolerances in very small sizes. However a problem exists because this material is fragile and easily broken. It is difficult to avoid breakage of a small and delicate piston during assembly and operation of the high pressure low volume pump.

SUMMARY OF THE INVENTION

A principal object of the present invention is to provide an improved high pressure low volume pump capable of providing accurately metered flows of liquids in the nanoliters per minute range at pressures as high as several hundred bars. Further objects are to provide a pump that can employ a very small piston made of a fragile material while overcoming the problem of breakage of the piston during assembly and operation of the pump; to provide a pump in which the need for mechanical piston retention, for example by a spring, is avoided; to provide a pump which does not require precise and expensive alignment of the piston with the piston drive system; and to provide a high pressure low volume pump overcoming the disadvantages of pumps that have been used in the past.

In brief, in accordance with the invention there is provided a high pressure low volume pump for high pressure liquid chromatography and the like. The pump includes a pumping section including a pump cylinder and passages for the flow of a pumped fluid into and out of the cylinder. A piston assembly includes a piston reciprocally movable in the cylinder and a piston holder supporting the piston at a first end of the piston holder. A piston drive system is connected between a motor and the second end of the piston holder for reciprocating the piston assembly in response to operation of the motor. The piston is an elongated slender rod having a diameter of less than about 10 millimeters. The interconnection of the drive system and the second end of the piston holder includes a ball-and-socket coupling with a spherical member pivotally received in a socket. A magnet in the socket holds the spherical member in the socket using magnetic force.

BRIEF DESCRIPTION OF THE DRAWING

The present invention together with the above and other objects and advantages may best be understood from the following detailed description of the preferred embodiment of the invention illustrated in the drawing, wherein.

DETAILED DESCRIPTION OF THE PREFERRED EMBODIMENTS

Figure 1:
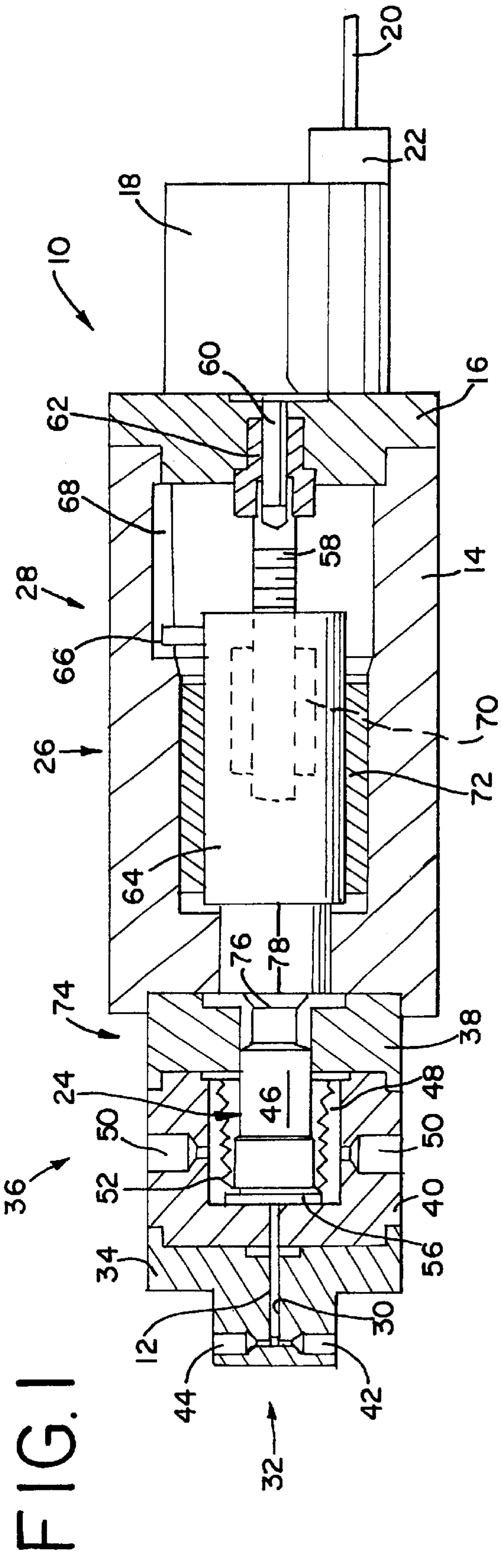
FIG. 1 is a sectional view of a high pressure low volume pump constructed in accordance with the present invention, taken along the major axis of the pump.
Figure 2:
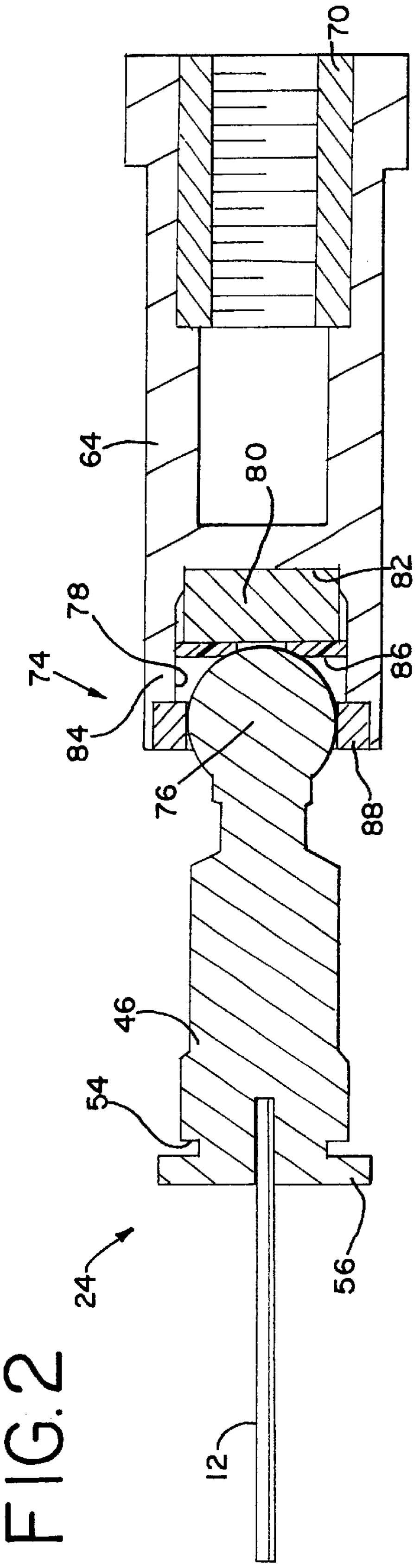
FIG. 2 is an enlarged sectional view of the piston assembly and drive system of the pump of FIG. 1.

Having reference now to the drawing, in FIG. 1 there is illustrated a high pressure low volume pump generally designated as 10 and constructed in accordance with the principles of the present invention. The pump 10 is useful for providing a solvent liquid mobile phase in high pressure liquid chromatographic procedures, and is capable of pumping solvents such as methanol, isopropyl alcohol, acetonitrile and others at low flow rates in the range of from about 50 nanoliters to about 250 microliters per minute at pressures of up to at least six hundred bars.

In order to achieve these desirable performance characteristics, the pump 10 includes a piston 12 in the form of an elongated slender rod having a diameter of less than about ten millimeters, and preferably having a diameter in the range of from about one to about three millimeters. The piston 12 is made of a crystalline material, preferably sapphire, or of a material having similar characteristics, such as a mineral, preferably zircon. The advantages of such materials is that they can be provided in the very small sizes needed for the present invention with precise tolerances and surface characteristics. A potential disadvantage of a piston 12 made of this material and size is that it is fragile and subject to breakage when the pump 10 is assembled and operated. The present invention overcomes this potential disadvantage and solves the problem of breakage of the pump piston 12.

Proceeding to a more detailed description of the pump 10, it includes a pump body 14 carrying an end cap 16 to which is secured a drive motor 18. Drive motor 18 is a stepper motor that can be precisely rotated under the control of a microprocessor that receives position feedback signals provided over a cable 20 from a detector 22 that receives signals from an encoder at the back of the motor 18.

A piston assembly 24 including the piston 12 is linearly reciprocated by a piston drive system 26 that is coupled to the motor 18 by a drive transmission 28 that converts rotary motion of the motor 18 to linear motion of the piston drive system 26 and piston assembly 24. The piston 12 reciprocates in a pumping cylinder 30 that is part of a pumping section 32 machined in a pump head 34 attached to a piston housing 36 including a cap 38 secured to the pump body 14 and a spacer body 40 between the cap 38 and the pump head 34.

The pumping section 32 in the pump head 34 includes a fluid inlet passage 42 and a fluid outlet passage 44, both communicating with the pump cylinder 30. There is sufficient clearance around the piston 12 for fluid to flow within the cylinder 30 along the surface of the piston 12, and the passages 42 and 44 may be located if desired at other points along the length of the cylinder, for example to permit inlet and outlet valves to be mounted directly within or on the pump head 34. An inlet flow valve (not shown) located at the pump head 34 or remote therefrom is opened to admit fluid to 1the passage 42 and cylinder 30 when the piston is moved out from the cylinder 30 (to the right as seen in FIG. 1). An outlet flow valve (not shown) located at the pump head 34 or remote therefrom is opened when the piston is moved into the cylinder 30 (to the left as seen in FIG. 1). The inlet and outlet flow valves can be check valves or microprocessor controlled valves such as solenoid valves. To provide continuous mobile phase flow in a HPLC system, an assembly of a plurality of valves 10 can be used so that outlet flow is provided by at least one valve 10 at all times.

The piston assembly 24 includes a piston holder 46 having an elongated, axially extending hole at one end into which the piston 12 is inserted and secured. The holder 46 reciprocates in a rinse chamber 48 within the spacer body 40. A rinse liquid flowing through rinse ports 50 can flow through the chamber 48. The pumped fluid is isolated from the rinse liquid by a collapsible bellows seal 52 having one end in a groove 54 in the piston holder 46 and another end captured between the cap 38 and spacer body 40. The fully extended position of the piston 12 seen in FIG. 1 is determined by engagement of a stop flange 56 of the holder 46 against the pump head 34.

Drive transmission 26 includes a threaded screw 58 that is axially aligned with and secured to a drive shaft 60 of motor 18 by a shaft coupling 62. The drive system 26 includes a hollow drive collar 64 axially receiving the drive screw 58. A radially extending projection 66 of the collar 64 is received in an axially extending slot 68 in the pump body 14 to prevent rotation of the drive collar 64. A threaded drive nut 70 is mounted within the collar 64 and mates with the drive screw 58. A bearing 72 supports the collar 64 for linear motion along the axis of the pump 10. When the motor 18 rotates the shaft 60, rotation of the screw 58 results in precisely controlled linear motion of the mating drive nut 70 and the drive collar 64.

In accordance with the invention a ball and socket connection 74 transmits drive force between the drive collar 64 and the piston holder 46. The end of the piston holder 46 opposite the piston 12 is spherical in shape to provide a coupling ball 76. The end of the drive collar 64 is provided with a socket 78 receiving the ball 76. The use of the ball and socket connection 74 avoids the need for exact alignment of the axis of the drive system 26 with the axis of movement of the piston assembly 24. The cost of precise tolerances is eliminated, and breakage of the piston 12 due to misalignment is prevented.

In order to retain the ball 76 within the socket 78 and to permit the drive system 26 to both push and pull the piston assembly, a magnet 80 is incorporated into the socket 78. The ball 78 is held by magnetic force rather than mechanically by a spring or other retention device. The socket 78 is generally cup shaped and includes a base wall 82 providing a nest for holding the magnet 80 and a side wall 84 surrounding the ball 76. The piston holder 46 including the ball 76 is formed of a magnetic, preferably ferrous, material attracted by the magnet 80. A nonmagnetic spacer 86, preferably of plastic, at the surface of the magnet 80 locates the ball 76 in close proximity to the magnet 80 and permits universal pivotal motion of the ball 76 in the socket 78. Although the magnet 80 can be of other materials, it is preferably a rare earth, neodymium-iron-boron magnet.

The magnetic retention force is maximized by a ring 88 of low magnetic reluctance material, such a soft iron, supported in the side wall 84 and surrounding the central plane of the ball 76. The ring 88 contributes to a low reluctance path including the magnet 80 and the ball 76 and increases the magnetic holding force by changing an open ended flux path to more of a closed flux path.

In assembling the pump 10, when the cap 38 is joined to the pump body 14, the ball 76 enters into the socket 78 and is urged by the magnet 80 to the fully seated position seen in FIG. 1. This is a gentle and smooth motion that does not apply shocks or stresses to the piston 12, thus avoiding breakage. If a mechanical retention system were used, the insertion of the piston 12 into the socket 78 would tend to cause breakage due to shocks and stresses arising from abrupt motions or from non axial forces applied to the piston holder 46.

While the present invention has been described with reference to the details of the embodiment of the invention shown in the drawing, these details are not intended to limit the scope of the invention as claimed in the appended claims.

What is claimed is:

1. A high pressure low volume pump for high pressure liquid chromatography and the like comprising:

- a pumping section including a pump cylinder;
- passages for the flow of a pumped fluid into and out of said cylinder;
- a piston assembly including a piston reciprocally movable in said cylinder;
- said piston assembly including a piston holder supporting said piston at a first end of said piston holder;
- a motor; and
- a piston drive system connected between said motor and the second end of said piston holder for reciprocating said piston assembly in response to operation of said motor;
- said piston being an elongated slender rod having a diameter of less than about 10 millimeters;
- the interconnection of said drive system and said second end of said piston holder including a ball-and-socket-coupling with a spherical member pivotally received in a socket;
- said socket being cup-shaped with a base and a side wall at least partly surrounding said spherical member;
- said pump being characterized by:
  - a magnet in said socket for holding said spherical member in said socket using magnetic force, said magnet being located in said base adjacent to said spherical member, and said socket further including a ring of low reluctance magnetic material supported in said side wall and surrounding said spherical member.

2. A high pressure low volume pump as claimed in claim 1, said piston being made of a crystalline material.

3. A high pressure low volume pump as claimed in claim 2 said piston being made of sapphire.

4. A high pressure low volume pump as claimed in claim 1, said piston being made of a mineral.

5. A high pressure low volume pump as claimed in claim 4, said piston being made of zircon.

6. A high pressure low volume pump as claimed in claim 1, said spherical member being said second end of said piston holder, and said socket being part of said drive system.

7. A high pressure low volume pump as claimed in claim 6, said motor including a rotatable drive shaft and said drive system including a drive transmission for converting rotary shaft motion into linear motion of said socket.

8. A high pressure low volume pump as claimed in claim 7, said drive transmission including a threaded shaft rotatably driven by said motor drive shaft and a threaded drive nut carried by said drive system.

9. A high pressure low volume pump as claimed in claim 1, said piston having a diameter in the range of from about one millimeter to about three millimeters.

* * * * *